United States Patent [19]

Koseki et al.

[11] Patent Number: 4,785,523

[45] Date of Patent: Nov. 22, 1988

[54] METHOD OF MANUFACTURING A COMPOSITE MEMBER OF METAL PLATES AND SYNTHETIC RESIN

[75] Inventors: Yasuo Koseki; Masamori Higuchi; Satoru Hirosaki, all of Kanagawa, Japan

[73] Assignee: Fuji Xerox Co., Ltd., Tokyo, Japan

[21] Appl. No.: 98,795

[22] Filed: Sep. 21, 1987

[30] Foreign Application Priority Data

Sep. 22, 1986 [JP] Japan ................................ 61-224223

[51] Int. Cl.⁴ .............................................. B23P 17/00
[52] U.S. Cl. ..................................... 29/530; 29/527.1; 264/259; 264/261
[58] Field of Search ............... 29/527.1, 530; 269/259, 269/261; 425/123, 810

[56] References Cited

U.S. PATENT DOCUMENTS 3,689,210  9/1972  Stein ..................................... 425/123
4,445,952  5/1984  Reynolds, III et al. ....... 174/68.5 X
4,470,786  9/1984  Sano et al. ...................... 425/123 X

FOREIGN PATENT DOCUMENTS 224514 11/1985 Japan ................................. 425/123

Primary Examiner—Carl J. Arbes
Attorney, Agent, or Firm—Finnegan, Henderson Farabow, Garrett and Dunner

[57] ABSTRACT

A method of manufacturing a composite member composed of metal plates and synthetic resin, and more particularly to a method of manufacturing such a member in which bending and drawing can be carried out on the member simultaneously.

6 Claims, 3 Drawing Sheets

FIG. 7
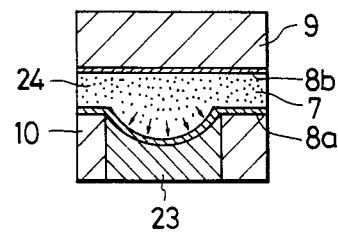
FIG. 8(a)  FIG. 8(b)
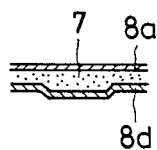 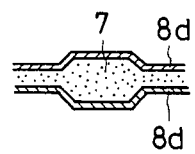
FIG. 9
PRIOR ART
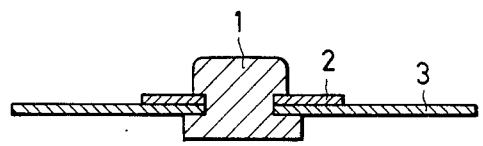

METHOD OF MANUFACTURING A COMPOSITE MEMBER OF METAL PLATES AND SYNTHETIC RESIN

BACKGROUND OF THE INVENTION

The present invention generally relates to a method of manufacturing a composite member composed of metal plates and synthetic resin, and particularly relates to a method of manufacturing a composite member composed of metal plates and synthetic resin in which bending work and drawing work can be carried out on the member simultaneously.

In a conventional prior art process for manufacturing a composite member as shown in FIG. 9, metal plates 2, 3 are fastened to each other by setting a first metal plate 2 on a second metal plate 3 within a metal mold. Resin is then poured into holes formed in the metal mold and when hardened forms a rivet 1.

Another method of manufacturing a composite member includes molding a synthetic resin plate through extrusion and using an adhesive agent to bond the resin plate at its opposing surfaces with metal plates to form a sandwich structure.

A composite member produced in accordance with the first method is weak in strength. A composite member formed by the second method is limited to the formation of a plate-like member. A bent or drawn solid structure cannot be formed. Further, the latter method requires at least two manufacturing steps: (1) forming a synthetic resin plate; and (2) bonding the synthetic resin plate with metal plates through an adhesive agent.

One object of the present invention is to provide a method for manufacturing a composite member of metal plates and synthetic resin in which the resulting member has improved strength.

Another object of the present invention is to provide a simple method for producing a composite member of metal plates and a synthetic resin.

Another object of the invention is to provide a manufacturing method in which bending work, drawing work, etc., can be performed simultaneously on the composite member.

Another object of the invention is to provide a method for manufacturing a composite member of metal plates and synthetic resin wherein the composite member has increased rigidity.

Another object is to provide a method for manufacturing a composite member lighter in weight than a similar member produced by conventional methods.

Another object is to provide a method for manufacturing a composite member that is highly accurate in achieving a selected shape.

SUMMARY OF THE INVENTION

In order to solve the foregoing problems, the present invention provides a method of manufacturing a composite member composed of metal plates and synthetic resin comprising the steps of providing a first metal mold having a piercing punch and a second metal mold having a piercing die; providing first and second metal plates between the first and second metal molds; moving the first and second metal molds together to pierce the first and second metal plates through the cooperation of the piercing punch and piercing die; attracting the first and second metal plates toward the first and second metal molds, respectively, to form a gap of a predetermined distance between the first and second metal plates; and injecting resin into the gap between the first and second metal plates to form an integral structure of at least three layers upon hardening of the resin.

BRIEF DESCRIPTION OF THE DRAWINGS

The manner by which the above objects and other objects, features, and advantages of the present invention are attained will be fully apparent from the following description when considered in view of the drawings, wherein:

FIG. 7 is an enlarged cross section of FIG. 6 showing the portion processed by drawing work;

FIG. 8a is an enlarged cross section showing drawing work carried out on one side of the pair of metal plates;

FIG. 8b is an enlarged cross section of a third embodiment of the invention showing drawing work carried out on both sides of the pair of metal plates; and FIG. 9 is a cross section showing a conventional method of the prior art for fastening plates to each other.

DETAILED DESCRIPTION OF THE PREFERRED EMBODIMENTS

Figure 1:
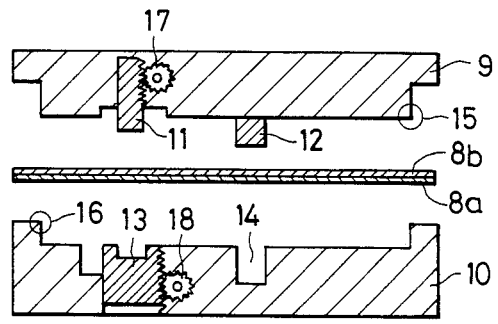
FIG. 1 is a sectional view of one embodiment of the present invention showing the metal plates and metal molds in a before-working state in which the mold assembly is opened.

In order to more specifically define the present invention, reference will be made to the accompanying drawings, which are incorporated in and constitute a part of this specification, and which illustrate preferred embodiments of this invention.

In accordance with the present invention, there is provided a method of manufacturing a composite member composed of metal plates and synthetic resin. One embodiment of the invention is shown in FIG. 1 which illustrates metal plate materials 8a and 8b subjected to antirust processing, a movable metal mold 9, a fixed metal mold 10, a movable piercing punch 11 and a fixed piercing punch 12 for press work, a movable piercing die 13 and a fixed piercing die 14, a punch-cutting edge portion 15 used for outer peripheral work, and a die-cutting edge portion 16 used for outer peripheral processing.

FIG. 1 also shows a piercing punch moving gear 17 for positioning the movable piercing punch 11, and a piercing die moving gear 18 for positioning the movable piercing die 13. In accordance with the invention, the two metal plates 8a and 8b are stacked and placed between the fixed metal mold 10 and the movable metal mold 9. The movable piercing punch 11 is stopped at a position where it has been projected downward by the piercing punch moving gear 17, while the movable piercing die 13, disposed in opposition to the movable piercing punch 11, is projected upward by the piercing die moving gear 18.

Figure 2:
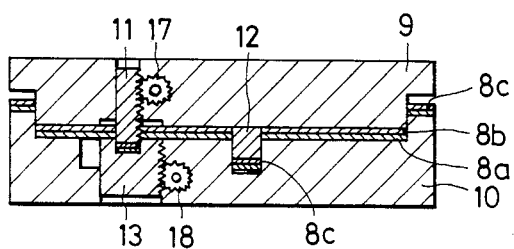
FIG. 2 is a sectional view showing the mold assembly in a closed position to press the metal plates together.

In accordance with the invention as embodied in FIG. 2, the movable metal mold 9 is lowered onto and pressed against the fixed metal mold 10. Thus, press work is carried out so that the stacked metal plates 8a and 8b are bored by the piercing punches 11 and 12. The outer peripheries of the stacked metal plates 8a and 8b are cut off and scraps 8c are generated.

Figure 3:
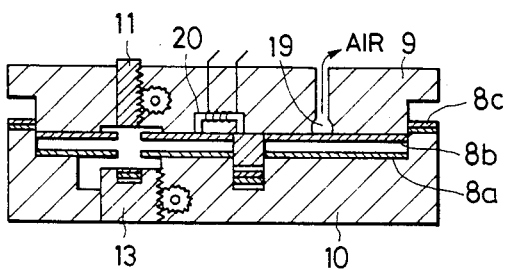
FIG. 3 is a sectional view illustrating the molds and metal plates separated by a predetermined distance.

As shown in FIG. 3 in accordance with one embodiment of the invention, the movable metal mold 9 is moved upward by a predetermined distance. At that time, air may be sucked through a hole 19 so as to attract or hold the movable plate 8b onto the movable metal mold 9, or an electromagnet may be provided at the central bottom surface of the movable metal mold 9 so as to attract or hold the movable plate 8b onto the bottom surface of the movable metal mold 9 by energizing the electromagnet 20. The metal plates 8a and 8b are then separated a predetermined distance apart. The piercing punch moving gear 17 and piercing die moving gear 18 are driven to move the piercing punch 11 and the piercing die 13 upward and downward respectively to thereby form a path for synthetic resin to be used in the succeeding step.

Figure 4:
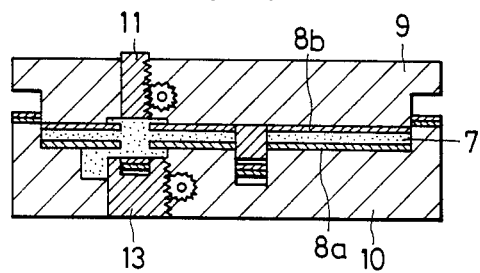
FIG. 4 is a sectional view showing synthetic resin injected into the gap between the metal plates.

After the metal plates 8b and 8a have been separated from each other by a predetermined distance in accordance with the invention, melted adhesive synthetic resin 7 containing a functional group is poured by injection molding through a path (not shown). Thus, as shown in FIGS. 3 and 4, the gap between the metal plates 8a and 8b and the hole punched by the piercing punch 11 are filled with the synthetic resin 7, and the gaps outside the metal plates 8a and 8b where they are not opposed to each other are also filled with the synthetic resin 7 which passes through the hole 19. On the other hand, the hole punched by the piercing punch 12 is not filled with synthetic resin 7 and forms a through-hole. Thus, a selected molded shape is simultaneously formed on the outer sides of the metal plates 8a and 8b.

Figure 5:
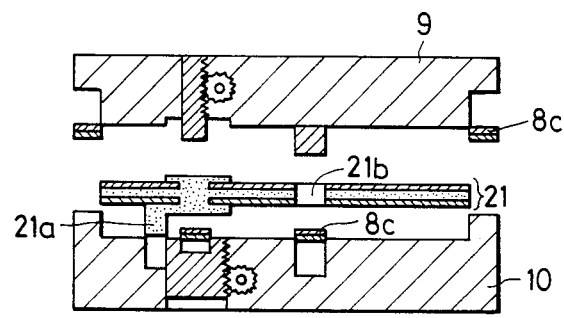
FIG. 5 is a sectional view showing the movable mold separated from the fixed mold leaving the molded product of metal plates and synthetic resin.

After the synthetic resin 7 is solidified in accordance with the invention, the movable metal mold 9 is opened as shown in FIG. 5. The composite member 21 composed of metal plates and synthetic resin is taken out of the mold. Since adhesive resin is used in this embodiment, a mold releasing agent is used on the respective inner surfaces of the movable and fixed metal molds 9 and 10 to enable separation of the molds from the resin. The fixed metal mold 10 may be arranged so as to be movable depending on the situation.

The composite member 21 produced through the above-mentioned manufacturing process has a structure of three layers, i.e., two metal plates and an intermediate layer of synthetic resin, and has a molded shape 21a formed of synthetic resin outside of the metal plates. Further, the composite member 21 has a through-hole 21b.

Figure 6:
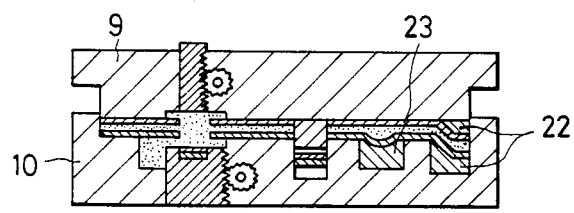
FIG. 6 is a sectional view of another embodiment of the present invention in which bending work and drawing work are carried out on the metal plates.

In accordance with a second embodiment of the present invention, a tool 22 for bending work and a tool 23 for drawing work, as illustrated in FIG. 6, are provided in the movable metal mold 9 in addition to the tool for cutting work.

In the operation of this embodiment in accordance with the invention, the two stacked metal plates are put in the metal mold assembly and pressed by a punch and a die which are provided in the metal mold assembly. Thus, a hole and a bent shape are formed in the metal plates at the same time. As shown in FIG. 7, an upper metal plate 8b is attracted to the bottom surface of a movable metal mold 9 through a vacuum or by magnetic attraction and the movable metal mold 9 is moved away from the fixed metal mold 10 by a predetermined distance. Thus, a predetermined gap is formed between the two metal plates 8a and 8b. Next, adhesive synthetic resin 7 is poured through injection molding into the gap so that a three layer structure having an outside shape determined by the shape of metal plates 8a and 8b is formed simultaneously. At that time, pressurized resin 24 for injection molding is supplied to a drawing portion as shown in FIG. 7, so that the metal plate members 8a and 8b are subjected to drawing work. The drawing work portion is pressed strongly onto the drawing work tool 23 by the synthetic resin 7, so that a molded product having no tendency to spring back is formed which accurately follows the shape of the metal mold. After the synthetic resin 7 has been hardened, the movable metal mold 9 is moved upward and the molded product is taken out.

In accordance with this embodiment of the present invention, it is possible to produce an integrally molded composite product having a shape similar to that of a member obtained through general injection molding, having high rigidity and being light in weight. Further, bending work can be carried out simultaneously with the punching work through press work, and the drawing work can be carried out simultaneously with the injection molding, so that the number of manufacturing steps can be reduced. Further, as described above, since the drawing work can be carried out on the metal plates through pressure injection molding, there is the advantage that only the metal mold at the die side is required for the drawing work.

FIGS. 8(a) and 8(b) illustrate another embodiment of the present invention showing modifications of the above-mentioned drawing work. In this embodiment, it is possible to carry out not only shallow drawing work on one side of the pair of metal plates 8a and 8b as shown in FIG. 8(a), but shallow drawing work on both the upper 8c and lower 8d plates as shown in FIG. 8(b). Accordingly, it is possible to easily form a composite member having a projecting portion. Further, if the drawing work is performed at a portion where force is exerted on the member, it is possible to effectively increase the partial strength of the member.

It will be apparent to those of ordinary skill in the art that that various modifications and variations can be made to the above-described embodiments without departing from the scope of the appended claims and their equivalents.

What is claimed is:

1. A method of manufacturing a composite member composed of metal plates and synthetic resin comprising the steps of:
    (a) mounting at least two stacked metal plates between first and second metal molds, said first metal mold having at least one of a fixed piercing punch and a movable piercing punch and said second metal mold having at least one of a fixed piercing die and a movable piercing die corresponding to said piercing punch;
    (b) performing pressing work on said metal plates;
    (c) separating said first and second metal molds by a predetermined distance while holding said metal plates facing each other to thereby form a gap of a predetermined distance between said metal plates;

(d) injection-pouring melted adhesive synthetic resin into said gap between said metal plates to form a resin layer therein; and, (e) removing a molded product after said resin layer has been hardened.

2. The method of manufacturing a composite member composed of metal plates and synthetic resin according to claim 1, further comprising the steps of:

(a) moving said movable piercing punch and movable piercing die inward to contact one another thereby creating metal plates having holes therethrough; and then (b) retracting said movable piercing punch and movable piercing die into said metal molds before pouring said synthetic resin, said synthetic resin being allowed to flow through said holes to the outsides of said metal plates, thereby forming a molded shape of synthetic resin around the outsides of said metal plates.

3. The method of manufacturing a composite member composed of metal plates and synthetic resin according to claim 1, further comprising the step of providing tools for bending at least one of said metal plates between said first and second metal molds.

4. The method of manufacturing a composite member composed of metal plates and synthetic resin according to claim 2, further comprising the step of providing tools for bending at least one of said metal plates between said first and second metal molds.

5. The method of manufacturing a composite member composed of metal plates and synthetic resin according to claim 1, further comprising the step of providing a tool for drawing at least one of said metal plates in at least one of said first and second molds to carry out drawing work by resin pressure injection pouring.

6. The method of manufacturing a composite member composed of metal plates and synthetic resin according to claim 2, further comprising the step of providing a tool for drawing at least one of said metal plates in at least one of said first and second molds to carry out drawing work by resin pressure injection pouring.

* * * * *